TAPE AND LABEL SELECTIVE LENGTH PRINTER AND DISPENSER

Filed June 12, 1959 3 Sheets-Sheet 1

INVENTORS
HOWARD W. AUBREY
RALPH V. CUDHEA
BY
Emery, Booth, Townsend, Miller & Weidner
ATTORNEYS

TAPE AND LABEL SELECTIVE LENGTH PRINTER AND DISPENSER

Filed June 12, 1959 3 Sheets-Sheet 2

INVENTORS
HOWARD W. AUBREY
RALPH V. CUDHEA
BY
Emery, Booth, Townsend, Miller & Weidner
ATTORNEYS INVENTORS
HOWARD W. AUBREY
RALPH V. CUDHEA
BY Emery, Booth, Townsend, Miller & Weidner
ATTORNEYS 3,046,882

TAPE AND LABEL SELECTIVE LENGTH PRINTER AND DISPENSER

Howard W. Aubrey, Westwood, Mass., and Ralph V. Cudhea, Nashua, N.H., assignors to Nashua Corporation, Nashua, N.H., a corporation of Delaware
Filed June 12, 1959, Ser. No. 820,022
12 Claims. (Cl. 101—227)

The present invention relates to devices and apparatus for adhesively conditioning, printing and dispensing selective lengths of flexible strip material, tape and the like for adhesive application for packaging and labelling purposes. More particularly it aims to provide improved means whereby repeat unit impressions may be imprinted upon the tape during its adhesively conditioning travel along a guided path from a roll supply to a delivery point where the selected tape or label length is severed and delivered conditioned for use. Further in this connection the invention provides for the adhesive conditioning, printing and dispensing of one, two or more unit lengths of the tape or label strip, such lengths bearing a corresponding number of printed label unit impressions, with the delivery and severance of the tape bearing the selected number of printed repeat impressions effected accurately and at the non-printed space interval between the last full impression of the selected length and the one next following, thus avoiding delivery of tape with partial impressions either at the leading or the trailing ends.

Various features of the invention are in some aspects useful with dispensing apparatus serving different types of adhesively conditioned tape including pressure-sensitive tape and dry gummed tape rendered adhesive by application of moisture, as well as tapes having a face treated to be adhesively conditionable by heat activation. In the embodiment selected for the purposes of illustration the dispensing device is particularly adapted for the selective-length delivery of strip materials herein referred to as heat-activated or heat-sensitizable as contrasted with pressure-sensitive material such as Scotch tape and with dry-gummed materials rendered adhesive by moistening. An example of such heat-activatable material is that of the patent to Perry No. 2,462,029 having the special advantage of retaining the adhesive or usefully tacky status for some time after heating.

In the drawings illustrating one exemplary embodiment of the invention:

Figure 1:
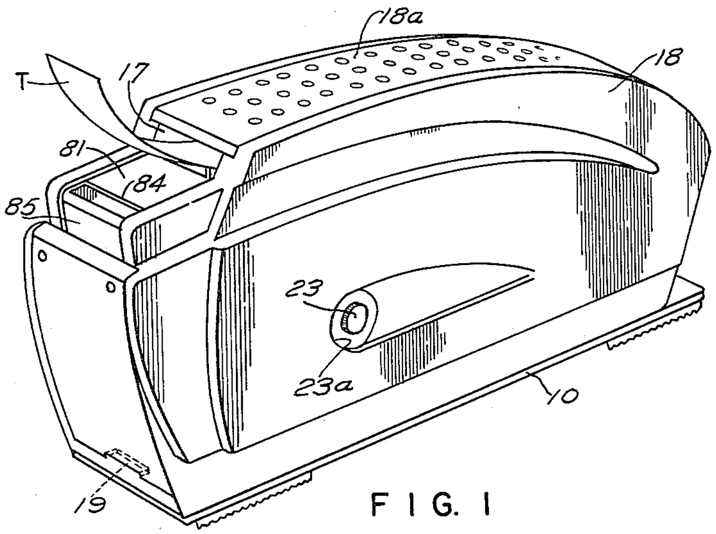
FIG. 1 is a perspective view of the tape dispenser as a whole.

In the illustrated example the device or apparatus of the invention comprises a supporting base 10 carrying an upright frame including front and rear walls 11, 12, a bottom wall 13 and a longitudinal side wall 15 defining a main compartment 16. The entirety of the frame and mechanism of FIG. 2 is adapted for enclosure by a removable housing cover 18 comprising an inverted trough-like unitary element shown operatively installed on the base 10 in FIG. 1 and adapted for bodily removal for access to the general assembly seen in FIG. 2. The cover

18 is releasably held upon the base 10 as by a hold-down lug 19 at the lower front end receivable beneath a fixed flange member on the interior frame, in cooperation with a releasable spring latch 19' at the rear end engageable with a recess in the frame rear wall 12. The cover 18, the main longitudinal portion of which may be of molded plastic or other material, desirably includes a protective top wall 18*a* perforated for circulation of air and dissipation of heat and extending forwardly to a mouth 17 for the exit of the tape at the delivery and severing station at the front of the machine.

Within the compartment 16 at the lower forward portion provision is made for rotatable support of a tape supply roll R, here shown as heat-sensitizable tape T with the heat-activatable face *a* of the tape wound inmost. The tape roll R is mounted for draft upon it by a user grasping the leading end of the tape T at the delivery and cut-off station adjacent the delivery mouth 17, where it is presented conveniently for seizure as between the thumb and forefinger, FIGS. 1 and 2.

The rotatable support for the supply roll R desirably is such as to provide adjustable frictional bearing tension with the attendant avoidance of backlash. Such means may be for example as in application Serial No. 678,195 (now U.S. Patent No. 2,929,907), having a common assignee with the present application, including a non-round spindle 20 gripping the inner wall of the hollow core of the roll R installed on it. At the remote end of the spindle from that seen in FIG. 2, between said spindle end and a fixed roll positioning and aligning disc 21 a friction washer or the like has flatwise engagement with said spindle end, while at the outer or free spindle end, toward the viewer in FIG. 2, the stud on which the spindle itself is rotatably carried is provided with compressively adjustable resilient washer-like means 22. The frictional holding pressure with respect to the roll R may thus be variably set by turning up or backing off the adjusting nut 23 tapped into the end of the spindle, as more fully shown and described in the stated application and not necessary further to detail here. The roll mounting spindle 20 and tape-tension adjusting member 23 are of a length to project laterally as through an opening 23*a* in the cover 18 provided therefor, FIG. 1, so as to be readily available for tape tension adjustment without removal of the cover 18.

As explained the instant embodiment of the invention is particularly adapted for use with heat-activatable tape T and accordingly is equipped with heating means for adhesively conditioning the tape. In this regard, and in the general overall construction and arrangement of the housing frame and of the main compartment therein, the dispenser of the present embodiment may be similar to that of the stated application and of the application Serial No. 727,579, (now U.S. Patent No. 3,006,567) divisional thereof, with the various modifications and other features in combination therewith as herein illustrated and described.

Thus the apparatus as here disclosed provides in and associated with the compact compartment 16 for conduction of the tape T rearwardly from the top of the roll R, thence through the printer assembly and selective length control means to be described, thence upwardly at the rear of the compartment and thence forwardly along an elongate guide and heater element 30 to the delivery station at the exit mouth 17. This heater element 30 is a flat tubular elongate structure with one smooth outer face, that at the top in FIG. 2, providing a supporting and guiding surface for the base or non-adhesive face of the tape T, opposite the heat-activatable face *a*. The heater element 30 as more fully disclosed in said earlier applications carries one or more electrical resistance heater elements extending generally from end to end thereof. Electrical energy therefor is supplied as through a plural-conduction appliance cord 35, FIG. 2, with plug-in provision, the cord being admitted to the compartment 16 as through the rear wall 12 and running forwardly, with the leads 37, 38 to the heater element. In circuit with the latter is an adjustable thermostatic switch designated generally at 40 and conveniently hung at the underside of the guide-heater 30.

As disclosed in more detail in said application Serial No. 678,195, (now U.S. Patent No. 2,929,907) the guide heater 30 with its connected electrical heater is thermally constructed and arranged to supply to the tape, with the machine plugged into the usual 110–115 volt A.C. circuit or other supply, the maximum operating temperature desired for the apparatus. A heater element with 100 watt rating has been found satisfactory. The thermostatic regulator 40 is of a type suited for the particular circuit and adapted to control the heater for maintaining temperature within a relatively moderate and adjustable operating range such as the mentioned 220° to 240° F., as by breaking and remaking the heater circuit from time to time as appropriate to the selected operating temperature range. The thermostatic device 40 is readily adjustable as appropriate to variable temperature conditions at places of use, and to the character of tape or of surface to which it is to be adhesively sealed.

Minimum friction hold-down means for the tape is provided adjacent the delivery station 17 as indicated generally at 50. Because the engagement of the tape by the hold-down means is upon the adhesively conditioned face *a* of the tape, which herein is uppermost during tape travel along the guide-heater 30, it is desirable that surface contact by the hold-down element be minimal. Such depresser means accordingly may be generally as in the mentioned applications. Herein it comprises a transverse series of parallel forwardly and downwardly inclined fine-pointed pins 51 held at the non-pointed ends in a cross-bar 52, the opposite ends of which are held at the forward portion of a pair of laterally spaced arms 53 having laterally aligned elongated slots 54. This depresser unit 50 is herein afforded capacity for full floating gravity contact upon the tape T. For this purpose a bracket 55 on the machine frame has at the upper end a horizontally projecting flat finger 56 received in and extending through the slots 54 of the arm pair 53 and retained as by a stop pin 57 at the free end of the finger 56. The dimensions of the slots 54 both as to length and height exceed those of the finger 56 substantially as shown. Thus the hold-down unit 50 and the pin series 51 thereof are free to move both in the vertical and the horizontal planes and both laterally and longitudinally with respect to the tape path for best minimal contact of the pins 51 with the activated adhesive during draft feeding of the tape.

The adhesively heat-activating and printing tape and label dispenser of the invention further comprises means for severing the drawn out length of printed and adhesively conditioned tape correlated with the printer and selective length control means to be described so as to effect tape severance between successive printed impressions, whether the selected length be that corresponding to one impression or a number thereof. Subject to the special requirements as to between-label severance imposed by the novel introduction herein of the printer and selective length means the cut-off means or sub-assembly also may be in general as in the mentioned applications, the severing means as herein shown at the left in FIG. 2, being a modification thereof.

In a front compartment 60 upon the common base 10 and within the unitary overall cover 18 and set off by the front vertical wall 11 of the frame from the tape supply and the printing and heating compartment 16 is an upwardly directed triangular blade 70 with sharp piercing points 71, and down flaring sharpened cutting edges 72. The base of the blade is fixedly mounted in an electrical resistance heater element 75 connected by leads 76 from the power supply cord 35. The base of the upright knife 70 and the heater element therefor are embedded in a block 78 of heat and electrical insulating material held between a pair of longitudinal bracket flanges 79 extending forwardly from the front wall at the left. This knife heater may be selected to maintain an even temperature on the blade 70, at an operating level for example of approximately 300° F.

Severance of a drafted length of the tape is effected by deflecting it downwardly into cutting engagement with the blade 70, normally locked means being provided for guarding against careless contact by a user's hand. Such means as illustrated in FIG. 2 comprises a depressible guard and delivery platform indicated generally at 80, constructed and arranged normally to shield the knife 70 and to be locked in the guarding position against unintentional exposure of the knife, yet to be released and automatically moved to blade-exposing position by direct coaction of the tape itself therewith in accomplishing the final draft and severance of a desired length of the adhesively conditioned tape.

The guard element 80 comprises a top plate or platform 81 having downturned side flanges 82 received between the sides of the bracket 79 and pivoted at the rear end upon a transverse pin 83 supported in the bracket sides and extending through the flanges 82 of the guard. Near the forward end of the platform 81 is a transverse slot 84 of a size for downward passage about the blade 70 for operatively exposing the latter. Forwardly beyond the cutter slot 84, toward the left in FIG. 2, a front guard plate 85 is horizontally pivoted as at 86 to the top or horizontal guard 81. This pivotally hung front plate 85 extends downwardly beyond the knife heater element 75 and may be deflected inwardly below the latter, providing a front and bottom shield adjacent the knife and the heater thereof. This two-part articulated guard 80 is normally held up in the masking position about the knife 70 as in FIG. 2, see also FIG. 1, as by means of a tension spring 87 connected at the lower end to the foot of the front guard plate 85 and anchored at the upper end to a fixed part on the bracket 79. Lateral projections on the bracket appropriately engaged with a side flange 82 of the pivoted guard element 80 provide limiting stops for the normally raised and the knife-exposing depressed positions of the guard.

The knife-masking element 80 is desirably locked in the normal elevated or shielding position of FIG. 2, so as to avoid unintentional depression, subject to automatic release by downward deflection of a drafted length of tape T. For this purpose there is provided a vertically movable trip plate 90 guided between the sides of the bracket 79 and by the compartment wall 11. This trip plate 90 is of a width to underlie and support the projecting end of the tape T and has an upper end 91 normally projecting upward beyond the platform 81 where it is presented immediately below the leading end of the tape to be seized for drafting the next tape length for delivery. The trip plate 90 is normally held elevated as by the tension spring 92 attached at the lower end to a foot 93 on the trip plate 90 and fixed at the upper end as to the pivot pin 83 of the platform. The trip plate 90 carries at an intermediate point a forwardly projecting finger 94 adapted in the elevated position of the trip 90 to stand abuttively behind a latch member 95 carried by the corresponding side flange 82 of the guard platform 81. With the trip 90 in the normal elevated position of FIG. 2 the finger 94 thereof by engagement with the latch 95 stands in the way of and blocks pivotal movement of the entire guard unit 80.

In operation, when the user has drawn off the selected length of activated and printed tape, in a forward direction generally parallel with itself and in substantial prolongation of the tape path along the guide-heater 30, the user merely lowers or pulls down on the tape. The latter first exerts downward pressure upon the upper end 91 of the trip 90, thus clearing the trip finger 94 from blocking abutment with the latch 95, thereby releasing the guard element 90 for downward and rearward swinging. Continued down-swinging of the tape by the user then depresses the guard 60 and brings the tape into cutting relation with the fixed pointed cutter blade 70 as the guard passes below and unmasks it. On completion of tape severence the lead end of the remaining tape is left free, automatically releasing the trip 90 for spring return to the tape-elevating and latch-locking position of FIG. 1, the platform-guard element 80 simultaneously being returned by its spring 87 to its normal locked FIG. 1 position.

Within the compartment 16 and in operative relation to the tape T en route from the roll R to the heater 30 there is provided, in correlation with the described draft-feeding, heat-activating and severing means, novel mechanism for imprinting on a face of the tape, that to be exposed in use, whatever legend, data, advertising, information or design may be desired within the capacity of the rotary printer means as herein disclosed.

There are many useful applications for tape and label strip so printed, activated and dispensed through the medium of the compact self-contained and readily portable device such as illustrated. One important use is for labelling, and particularly in such areas as stock-rooms, shipping rooms of factories handling large numbers of small items packaged or boxed singly, in pairs or other numbers and requiring identification as by a stock number, manufacturer's part number and the like. In such uses it is frequently desirable to be able quickly to shift the length of label as between a relatively short label carrying one printing impression or panel of the printed matter, and labels corresponding in length to two or more print panels. In connection with such selective length change the printed matter may or may not be changed, according to circumstances. If the next batch of items to be labelled has, for example, the same maker's part number but merely the number of items per package or other packaging factor is changed, the printed matter may remain the same; for different items the printing may be changed. Under the invention provision is made to satisfy these various requirements, both as to length of label delivery to give one or more printing repeat impressions or panels and also as to what is printed.

In FIG. 2A there is shown diagrammatically a length of tape T containing a number of successive label units or tape length increments *t*. On each unit the area for the printed matter, herein referred to as a repeat impression, box or panel is indicated by the dotted rectangle and the letter P. The dispenser of the illustrated embodiment of the invention is selectively pre-settable to deliver a succession of single-impression label units such as bracketed at A, or two-impression labels as indicated by the bracket B, or twice the latter length so as to contain four print panels or repeat impressions P as indicated by the bracket C. And for any of these selective label-length settings the variable control is such that the cut-off of the given label strip occurs accurately between succeeding print panels P and not through a print area.

Figure 3:
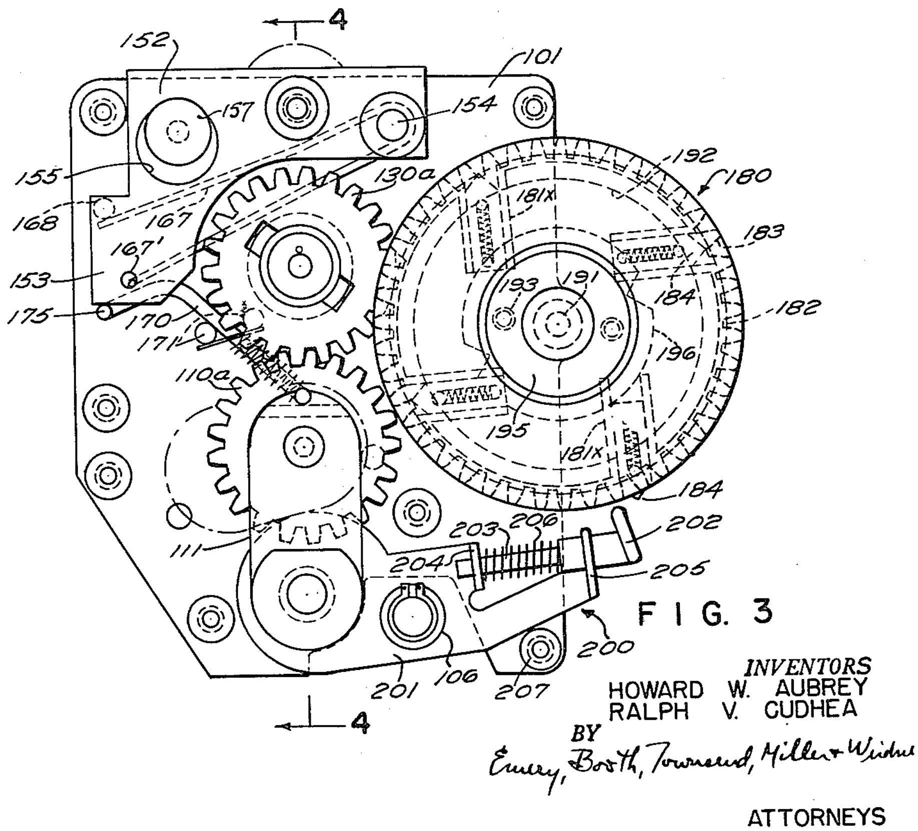
FIG. 3 is a further enlarged side elevational view of the printer assembly unit of FIG. 2, with one side plate, that nearer the viewer in FIG. 2, and certain associated parts removed to expose the operating mechanism.
Figure 4:
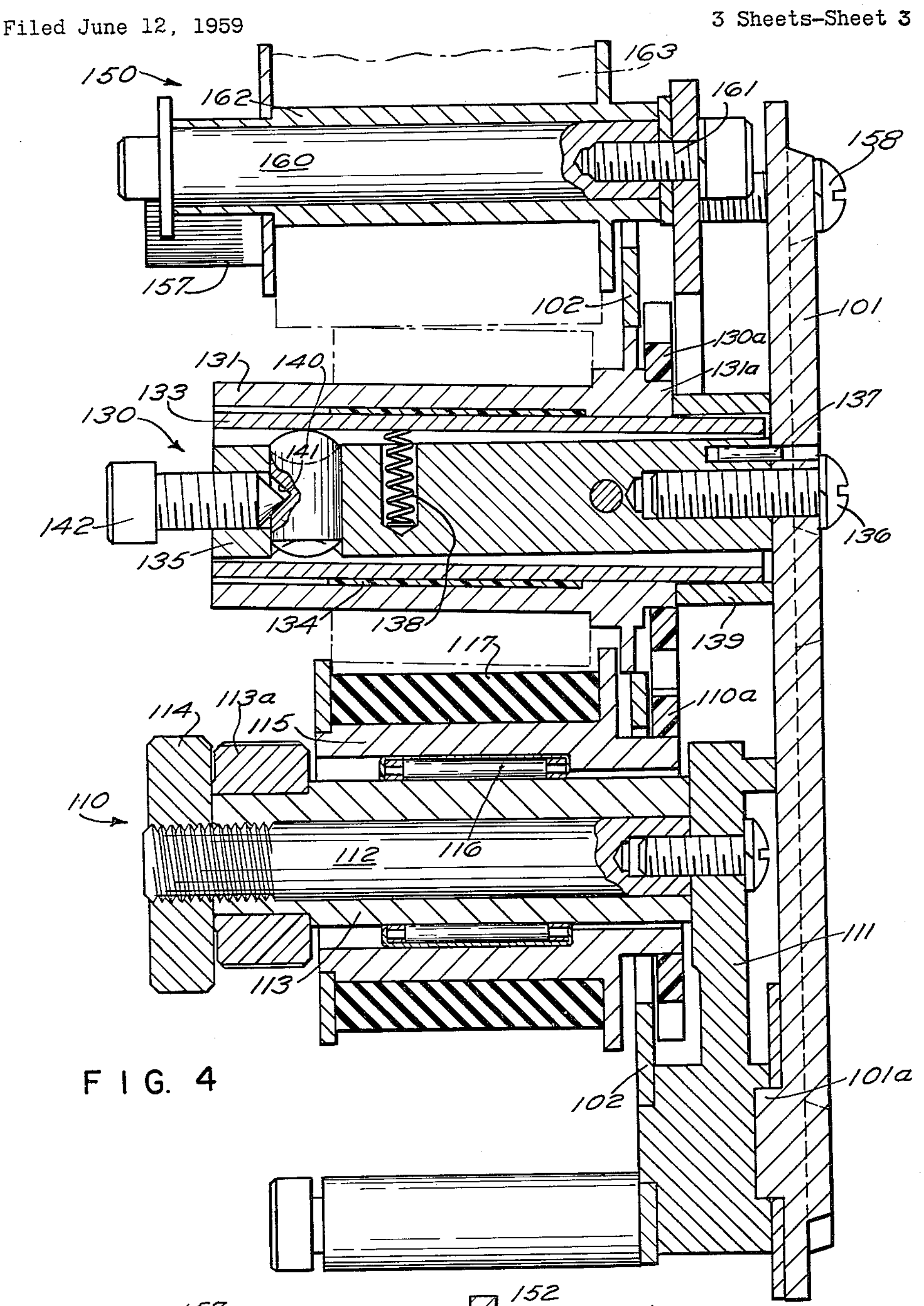
FIG. 4 is a further enlarged vertical sectional view as upon the line 4, 4 of FIG. 3.

The printer and selective length control is herein constituted as a sub-assembly adapted for installation in and removal from the dispenser bodily as an operative unit, designated generally at 100, FIGS. 2, 3 and 4. It includes its own mounting cage or suport constructed and arranged for operative assembly into the dispenser chamber 16 in printing and advancing relation to the tape moving from the roll R to the heater and delivery guide 30.

Such support of the length-selecting printer unit 100 comprises a main or back side plate or casting 101 and spaced from it, laterally of the dispenser, and a parallel front side plate 102 seen in FIG. 2 and in section in FIG. 4; in FIG. 3 the front side plate 102 and parts laterally outward thereof, toward the viewer, are removed for clarity. Lateral lugs on the back plate 101, as at 103, 103, FIG. 3 tapped to receive screw bolts through the front plate 102 space and connect the two plates into a carrier cage or mount for operating parts including certain gearing in the space between the plates and for the main rotary elements of the printer at the outer side of the front plate 102, to the left thereof as viewed in the sectioned FIG. 4.

The several elements of the printer and length selector assembly are operatively mounted on the support constructed by the spaced carrier plates 101, 102 in novel construction and arrangement to afford the various functions and adjustive capacity with respect to the printing and to the length control as hereinafter described. The printer unit as a whole comprises among the primary elements the plurality of generally parallel rotary cylindrical members or rolls as seen in FIGS. 2 and 4. In order from bottom to top in said figures these comprise a bed roll or impression roll designated generally at 110, a printer roll indicated as a whole at 130 and an inking roll designated generally at 150.

Before describing the respective rolls in more detail, the path of the tape T with respect to them and to the length control means will first be pointed out.

At the lower portion of the supporting frame 101, 102 of the unit 100 is fixed thereon a stud 104 projecting horizontally across the tape path and rotatably carrying a tape-guiding idler roll 105. The tape T from the rotatably supported and tensioned roll 5 is led rearwardly and downwardly about said idler roll 105 and thence upwardly around the bed roll 110, thence down around another idler and pawl lifter roll 106, thence rearwardly and upwardly about a further guiding idler roll 107 and forwardly over an upper idler guide roll 107′ onto the heater-guide element 30 previously described. It is noted that in the normal operating position of the bed roll 110 as shown in FIG. 2 the location of the underlying idler rolls 105, 106 relative to it are such that the tape is caused to have non-slip engagement with the bed roll 110 over a substantial circumferential portion thereof, desirably at least about 180° as shown. In this manner draft upon the tape by the user exerts a positive driving action to the bed roll 110 so that the latter in turn may accord an accurate degree of turning motion to the other elements, particularly the printer roll 130 and the length control means to be described.

In the further interest of non-slip travel of the tape about the bed roll 110, particularly in the event of slack in the tape coming from the supply roll R and although generally taken care of by the described supply roll tensioning means, there is provided for the bed roll 110 a brake or friction arm 108 pivotally hung at the upper end as upon an extension of one of the plate connecting studs 103. This arm 108 carries a friction-surface shoe 108*a* of substantially arcuate extent and yieldably bearing against the tape passing about the bed roll 110, and being biased toward the roll as by a torque spring 109 supported on said stud 103.

In the installed operative position of FIG. 2 the three main active rolls 110, 130, 150 stand in mutually tangential relation for printing by the printer roll 130 upon the tape as it passes over the impression or bed roll 110 and for application of ink to the type of the printer roll by the inking roll 150. To facilitate bodily dismounting of the type carrying cylinder of the printer roll 130 the bed roll 110 is so mounted on the unit support 101, 102 that it may be shifted bodily forward, toward the left in FIG. 2, sufficiently to carry it out of engagement with the printer roll 130.

For this purpose the bed roll is carried upon an upright arm 111, FIG. 4, see also FIG. 3, having a bearing recess at its lower end received on a pivoted stud 101*a* on the back plate 101 and an axially aligned cylindrical boss 112 received in a conformant bearing aperture at the front plate 102. The axial bearing stud 112 for the bed roll is affixed at the inner end to the upper end of the arm 111 as by a screw bolt. The stud 112 receives an eccentric bearing sleeve 113 with adjusting head 113*a* within a lock nut 114 threaded on the outer end of the stud 112. The bed roll proper comprises a cylindrical member 115 surrounding the sleeve 113, desirably with a needle-bearing element 116 interposed between them externally carrying a rubberous cylindrical sleeve 117 presenting the outer surface for non-slip engagement with the tape T. By loosening the lock nut 114 and turning the eccentric sleeve 113 by its hub 113*a* and about the axis of the supporting stud 112 the tape-gripping cylinder 117 is bodily shifted in parallelism with itself toward or from the printer roll to present the tape in proper impression-receiving relation to it.

The printer roll 130 also is mounted for bodily adjustment to present the type thereof in optimum printing relation to the tape at the bed roll 110 and in ink-receiving relation to the inker roll 150. It comprises a hollow cylindrical type cylinder 131 upon which the type pieces 132, FIG. 2, of the rubber or resilient variety are set in the retainer grooves of holder rings, not shown in detail and which may be for example as in the application Serial No. 801,294 of the same assignee herewith. The type cylinder 131 is rotatable about a hollow spindle 133 having a low-friction bearing sleeve 134 interposed between it and the type cylinder. Said spindle 133 is non-rotatably held with capacity for axial tilt adjustment upon a stud 135 having the inner end affixed to the back plate 101 as by the screw bolt 136. The stud is locked against rotation and in a determined position about its axis as by a lock pin 137 at the inner stud end projecting into an aperture in the plate 101.

The spindle 133 on which the type cylinder 131 is rotatable has an internal diameter somewhat larger than the diameter of the stud 135 and is yieldably spaced from it radially as by one or more springs 138 disposed in radial recesses in the stud 135. The spindle 133 is further located at its inner end within a spacer collar 139 interposed between the frame back plate 101 and the inner end of the type cylinder 131.

Thus the spindle 133 together with the type roll 131 rotatable upon it are afforded capacity to be tilted axially with reference to the horizontal and to the adjusted axis of the impression roll 110, substantially as illustrated in FIG. 4. For this purpose the stud 135 has a diametral aperture at the outer portion slidably receiving a plug-like rounded nose positioner cam 140. Projection of this cam 140 radially from the stud 135 accords a corresponding degree of tilt to the spindle unit 133. To accomplish this the slide cam 140 has a camming recess 141 disposed opposite the inner tapered end of a tilt-setting screw 142. By turning up or backing out this tilt-controlling screw 142 the cam member 140 is radially projected or retracted to increase or decrease the tilt of the effective axial position of the printer roll 130. It will be understood that when the cam 140 is symmetrically located relative to the stud axis a condition of zero tilt is obtained should such be appropriate for best cooperation with the impression roll 110 as for example when fresh type upon the printer roll 130 and a fresh resilient impression collar 117 have been installed on the respective rolls.

Figures 2, 2A:
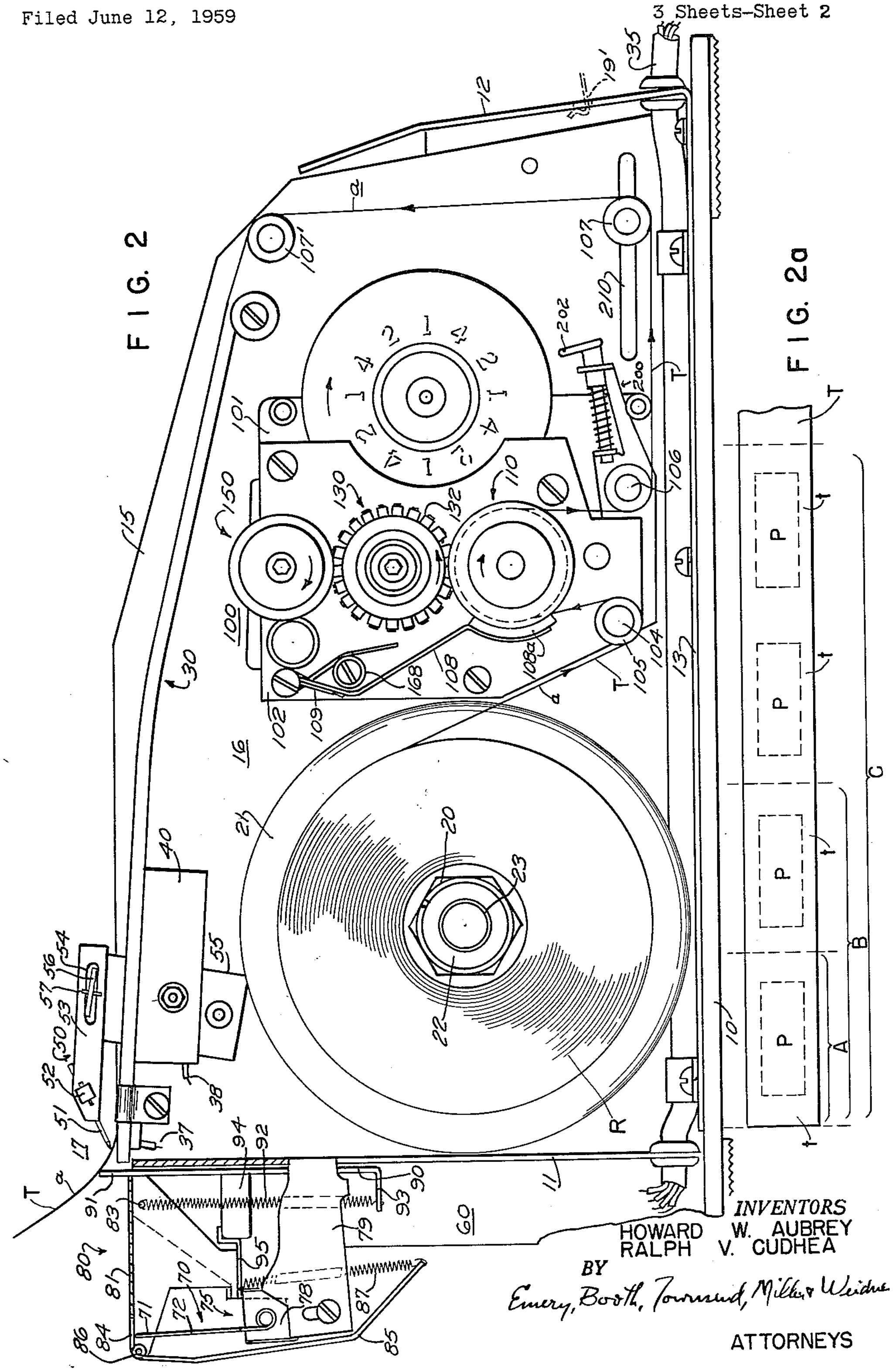
FIG. 2 is a right side elevation upon a larger scale and with the housing cover removed.
FIG. 2A represents diagrammatically a length of the strip material.

As seen in FIG. 4 and more fully in FIG. 1, the impression roll 110, driven by draft of the tape, and the printer roll 130 have gearing connection for positive driving of the printer roll 130 from the impression roll 110. Such gearing is located in the space between the back and front plates 101, 102. In FIG. 3 the outer faces of the gears are viewed direct because the front plate 102 and the rolls proper are removed for clarity in said FIG. 3. On the inner end of the bed roll cylinder 115 is demountably fixed a drive gear 110*a* of nylon or other material meshing in 1 x 1 ratio with a like gear 130*a* keyed by lugs 131*a* upon the inner end of the type cylinder 131. As later explained the type roll gear 130*a* in turn meshes in 2 x 1 ratio with the larger gear of the length selector disc.

Figure 5:
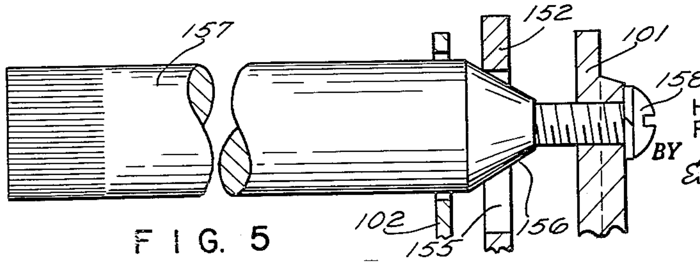
FIG. 5 is a detail view of one of the adjusting elements of FIGS. 3 and 4.

The printer assembly unit 100 further includes upon the carrier or frame 101—102 thereof means for supporting the inking roll 150 with capacity for bodily movement in self-parallelism for approach to and retraction from the printer roll 130 and also capacity to be variably tilted for best inking relation with the faces of the type pieces upon the printer roll 130. For this purpose there is provided in the space between the back and front plates 101, 102 an ink roll hanger plate 152 having a horizontal upper portion and a tapering leg 153 forward of the printer roll. This hanger plate 152 has horizontal pivotal support at its rear portion on a pivot stud 154 on the carrier plates 101, 102. At the forward portion the hanger plate 152 has a circular aperture 155 receiving the inner tapered cam end 156 of a tilt-regulating stud 157, see also FIG. 5, extending outwardly through an enlarged aperture therefor in the front plate 102 so as to be readily accessible at the outer or free face of the printer unit. At the inner end the regulator stud 157 has a central tapped bore threaded onto a screw bolt 158 on the back plate 101. The hanger plate 152 is in longitudinal line with the tapered nose cam 156 of the regulator stud 157, see particularly FIG. 5. Hence by turning the latter in one or the opposite direction a higher or lower portion of the cam nose 156 is brought under the roll hanger plate 152 correspondingly to elevate or to lower said plate at the forward portion and pivotally about the pivot stud 154. This accordingly raises or lowers the ink roll proper relative to the printer roll 130.

Said ink roll proper includes a supporting spindle 160 having the inner end anchored on the hanger plate 152 at an intermediate portion thereof as by the set screw 161, a spool-like sleeve 162 rotatably received on the spindle 160, and a cylindrical ink-carrying body 163 disposed on the spool 162. Such ink supply-carrying cylindrical body may be of any known or preferred construction such as a series of axially aligned felt washers with an outer cylindrical covering of a sleeve-like knitted cotton or other ink-transfer material.

Further, the mounting of the inker roll hanger plate 152 is such that the plate is adapted to be swung laterally of the machine so as to shift the plane of the plate relative to the vertical and accordingly accord to the axis of the inker roll, being perpendicular to the plate, a controllable degree of tilt relative to the horizontal in one or the opposite directions. Under such tilt adjustment the hanger plate 152 is in effect swung about a longitudinal horizontal axis adjacent its upper end, at the level of the pivot stud 154 and the lifter regulator cam 157. For this purpose the pivot stud 154 for the hanger plate has a conical portion at the outer end and the bearing aperture is marginally rounded, thus in effect affording the described lateral swinging pivotal support for the plate, the same further being similarly accomplished and permitted by reason of the described conical nose cam 156 of the height regulator 157. A compression coil spring 165 surrounds the pivot stud 154, bearing between the hanger plate 152 and the back plate 101 of the unit so as to urge the hanger plate toward the unit front plate 102. Threaded through the front plate 102, see FIG. 2, is a tilt regulator stud 168 having its inner end projecting into lateral engagement with the depending leg 153 of the hanger plate 152. By turning said regulator screw 168 inward the bottom portion of the hanger plate is thrust toward the back plate 101 thereby correspondingly tilting the axis of the inker roll 150 downwardly at the outer end thereof. Reverse turning of the screw 168, to retract the same, enables the hanger plate to be reversely thrust outwardly by the spring 167, to return the ink roll to horizontal axial position or to effect opposite tilting thereof, in the upward direction at its outer end.

The printer assembly unit 100 as herein disclosed further comprises connections operatively interposed between the impression roll 110 and the inker roll assembly 150 so that upon bodily forward shifting of the impression roll 110 for opening it away from the printer roll for replacement of the latter the inker roll is at the same time lifted or opened bodily away from the printer roll. Thus for rapid replacement purposes, as for substitution of another type cylinder carrying a different set-up of printed matter, both the rolls operatively associated with the printer roll, namely the impression roll herein below it and the inker roll herein above it, are conjointly movable away from the printer roll in an opening fashion and thereby affording free access to the printer roll for withdrawal and replacement of the type cylinder proper.

As earlier described, the impression roll assembly 110 in its entirety is carried at the upper end of the arm 111 horizontally pivoted at 101*a* at its lower end on and between the back and front plates 101, 102. Thus the impression roll unit 110 is adapted to be swung forwardly, to the left in FIGS. 2 and 3, while retaining meshing engagement of the gears 110*a* and 130*a*. To permit such swinging the front plate 102 has an elongate recess accommodating said impression roll "opening" movement. The position of said recess is indicated in phantom line at 102*x* on FIG. 3, it being out of sight behind the impression roll 110 and tensioning arm 108 in FIG. 2.

Operatively between the carrier arm 111 of the impression roll 110 and the hanger plate 152 of the ink roll 150 there is interposed a floating thrust-link connection. This comprises a rigid rod 170 slidably guided between a pair of bosses 171 on the back plate 101. The lower end of the link rod 170 is pivotally set in a recess in a lateral projection 172 on the carrier arm 111. An expansion coil spring 173 surrounds the lower end of the rod 170, thrusting between the arm 111 and a cross pin 174 on the rod 170, thereby urging the latter upward, and exerting down thrust on the carrier arm 111. The upper part of the rod 170 has a rearward and laterally turned end 175 engaged beneath the depending front portion 153 of the ink roll hanger plate 152.

The connector rod 170 is offset relative to a radius of the impression roll 110, in the active operative position of the latter, as in FIGS. 2 and 3. It is thus in effect "across" center with respect to the impression roll 110 and the carrier arm 111 of the latter, tending to retain said roll assembly in said operative position. When said roll is to be shifted forwardly, by grasping the head nut 114 and swinging the carrier arm 111 counterclockwise viewing FIGS. 2 and 3, the rod 170 is thrust upward and in turn lifts the ink roll hanger plate 152, moving it about its pivot point 154 and consequently lifting the ink roll 150 away from the printer roll 130. In this opening or release movement the rod 170 is caused to "cross center," so as to be forward of the centers of the roll 110 and of the carrier arm pivot 101*a*, thus tending to retain the parts in such opened or retracted position relative to the printer roll assembly 130, enabling easy and rapid replacement of the type cylinder 131 thereof.

The mentioned spring 167, FIG. 3, is of a scissors form, having at the closed end a coil portion surrounding the hanger plate pivot stud 154 and forwardly extended legs, with the free end of one set into an anchor hole 167′ in the hanger plate 152 and the other end engaged beneath the mentioned tilt regulator screw 168.

As already explained the invention further provides in novel cooperative relation with the roll supporting, draft feeding, printing and adhesively conditioning mechanism of the dispenser unique measuring and selective length provisions. These are in the illustrated embodiment associated with the printer unit and the tape-draft-driven parts thereof, and as shown are incorporated with the printer unit 100 and the carrier plates 101, 102 thereof for installation and removal as a unit therewith and relative to the main frame of the dispenser as a whole.

The length-selecting mechanism comprises a selector disc or drum designated as a whole at 180. It comprises a circular front plate 181 having at the back face near the periphery a cylindrical flange 182 carrying a circumferential series of radial teeth 183 constituting a gear meshing with and driven from the print roll gear 130*a*. This gear-plate 181 has at the inner face, inwardly of the flange 182 a plurality of off-radial guide channels 181*x*, herein four, for a like number of pawls 184 slidable therein respectively. Each pawl has a longitudinal slot into which projects a stop pin 185 on the main plate 181 within the corresponding pawl guide channel. An expansion coil spring 186 in each pawl slot bears between the fixed stop pin and the inner end wall of the slot, thereby normally retracting the pawls to a non-projecting or inactive position within the disc periphery, as shown for the upper three of the pawls in FIG. 3. Openings provided in the flange 182 of the selector plate opposite each of the pawls 184 permit one or more of them to be projected to operative position beyond the selector disc margin. In FIG. 3 the lowermost pawl 184 is shown in such active projected position.

Selective setting of the pawls is accomplished by a cam means associated with the central rotatably supporting element of the selector unit as a whole. Such element as seen in FIGS. 2 and 3 comprises a central hub 190 having a central bore rotatably received on a bearing stud 191 projecting outwardly on the back plate 101. The selector disc has a central bearing aperture at which it is supported on the hub 190 with capacity for relative turning as between the selector disc 181 and the hub, for pawl setting purposes. At the inner end the hub 190 has a radial flange 192 providing a rear cover for the pawl-carrying compartment of the selector disc 181. At the front face of the selector disc there is affixed to the hub 190 as by screws 193 a selector knob 195. In line with the bottoms of the pawls 184 the knob-attached hub 190 has formed on it the peripheral cam element proper 196 having a row of angular recesses distributed about it. The circumferential face of the cam 196 is dimensioned and positioned to project such one or more of the pawls 184 when the circumferential raised portion of the cam 196 comes opposite the inner ends thereof. In FIG. 3 but one pawl is shown thus activated, that nearer the bottom. In this setting the other three pawls are retracted by their springs into the respective recesses or valleys of the cam then lying opposite them. These pawl retraction recesses are so located about the cam 196 and the operating knob 185 thereof that either one, two or four pawls 184 may be rendered active, the pawls in this example being angularly spaced 90° about the selector disc.

For cooperation with the selector disc 180 and the pawls thereof there is provided, herein on the printer assembly unit 100, a stop latch or dog designated generally at 200 and adapted to be controlled by draft upon the tape. It comprises a generally horizontal arm 201 pivoted at the forward end, toward the left in FIG. 2, upon the same horizontal stud 101*a* on which the impression roll carrier arm 111 is mounted. At an intermediate point the arm 201 carries in the path of the tape an idler roll 106 previously mentioned and whereby upon initial exertion of feeding draft upon the tape the arm 201 is lifted to bring the stop element thereof into length-measuring and feed-stopping engagement with an active pawl 184 of the selector 180. The stop element proper comprises a latch or dog 202 at the rear end of a slide bar 203 slidably held and guided in apertures in lateral flanges 204, 205 at the rear portion of the arm 201. An expansion coil spring 206 surrounding the slide bar 203 between the forward flange 204 and a shoulder on the slide bar normally urges the latch element 202 rearwardly, toward the right in FIGS. 2 and 3. The weight of the arm 201 and parts carried thereby is such that the arm, in the absence of draft upon the tape, automatically falls by gravity to the stop retracted position shown in the views. A stop collar 207 on one of the plate connector bolts, at the lower right corner of the printer and selector assembly unit, defines the down limit for the trip arm 201.

In the illustrated embodiment the printer roll 110 is for the purposes of the disclosure assumed as of a diameter appropriate to carrying two label-printing impressions, at the respective half-cylinder portions thereof. That is, with reference to the diagram FIG. 2A, one full rotation of the printer roll 110 corresponds to the drafting of two label-lengths *t*, each with an imprint P thereon. Further, the described gearing affords a 2 x 1 ratio as between the printer roll 110 and the selector disc 180. Thus one full turn of the selector corresponds to four label increments *t*, each bearing a print impression P.

With the selection setting as in FIGS. 2 and 3, wherein a single pawl 184 is in active setting it is apparent that in each feed-drafting cycle a continuous tape length equivalent to four label increments *t* will be afforded, as indicated by the long bracket lettered C' in FIG. 2A. Upon the start of draft of the tape by the user the stop-arm 200 is elevated, presenting the stop dog 202 just back of but in the path of the actively set pawl 184. Thus on completion of one turn of the selector 200, during which four label increments *t* are delivered, the selector disc will be locked by engagement of the pawl 184 against the stop dog 202. Thereupon the user depresses the length of heat-activated tape thus dispensed, releasing the knife-masking guard 80 and effecting tape severance by the then exposed knife 70.

The dimensioning, locating and arrangement of the tape-cooperative parts is calculated to be such that the described severance is effected between label increments *t*, whether tape lengths of one, two or four such increments are being dispensed. Capacity for adjustment in this respect is afforded herein by means of the rear idler guide roll 107. As shown the side frame is formed with a slot 210, and the guide roll 107 may be set at any point along it, by release and re-tightening of its anchor bolt, as appropriate to bring the tape-cut-off between printing impressions P.

As earlier described the type cylinder 131 of the printer roll has clutch lugs 131*a* which correlate it relative to the gear train. The set-up of the resilient type on the roll is circumferentially arranged with reference to one such lug as the print starting point. Consequently, in view of the non-slip drive by the tape imparted to the impression roll 110 and through the positive gearing to the length selector and control wheel 180 accurate and incrementally selective lengths of the labelling tape are dispensed.

The selector setting knob 195 conveniently is indexed and the pawl-carrying disc is appropriately marked, as 1, 2 and 4, at one or more quadrants thereof, to indicate the positioning of the setting cam, accomplished by turning the knob relative to the disc, for projecting one pawl 184, or two diametrically opposite pawls, or all four of them. For convenience of the operator the marks "1" desirably are calibrated about the selector disc to designate setting for delivery of single increment label lengths, this being the situation when all four pawls are active and the selector-control wheel 180 accordingly is halted after each quarter-turn thereof and each half-turn of the printer roll. The marks "2" are calibrated to afford two label increments *t* and two printing impressions, as produced by half-turns of the selector-control 180 and corresponding full turns of the printer, there being two pawls, 180° apart, set to be active in this instance. Similarly, the marks "4" are calibrated to afford four label increments at each cycle of tape draft, as accomplished by a full turn of the selector-control wheel and corresponding two full turns (four imprints) of the printer roll 130.

In setting up of the type upon the type cylinder as described a gap is left at the type face level following an imprint, whether the type setting is for one imprint to each half-cylindrical portion or otherwise. Under the described positive feed and gearing arrangement correlated with the type set-up such gap will always stand at the top of the printer roll at the end of each feed cycle. Accordingly the type roll and the inker roll momentarily are disengaged, permitting the ink roll to coast slightly ahead of the halted printer roll. This provides for re-engagement between these rolls at a fresh point minimizing rutting or other wear.

Toward the end of each delivery cycle, as the next projected pawl comes into stopping engagement with the dog 202, the latter is yieldably moved forward as permitted by the spring mounting thereof. At the limit of this movement all turning of the parts is positively halted and further draft of tape is blocked. This informs the operator that he has obtained the desired length, whereupon he depresses the fed length of tape and effects the cut-off. Such severance of the tape immediately releases the draft tension upon it, between the printer assembly and the guide-heater element and there affords such slack to permit the stop arm 200 to drop by gravity and withdraw the dog 202 from the path of the pawls 184. Being thus freed the dog 202 is moved rearwardly by its spring, to the right in FIG. 3, in readiness for elevating into length-measuring and halting relation with the selector-control wheel 180 upon institution of the next cycle.

From the foregoing description in association with the drawings it is evident that applicants have provided a compact tape and label dispenser suitable for counter and other use and wherein the aspects of tape supplying, feeding, printing, heat-activating and controlled selectible measured label length delivery are operatively correlated in novel manner productive of new and improved results in the field concerned.

Our invention is not limited to the particular embodiment thereof illustrated and described herein, and we set forth its scope in our following claims.

We claim:

1. In a tape and label dispenser having a housing providing support therein for a roll of tape to be drawn on for adhesive application and having means defining a path for the tape from the roll to a delivery point and along which path the tape is adapted to be advanced by manual seizure and draft upon the free end thereof, a rotary printer assembly unit comprising bed, printer and ink rolls having generally parallel axes, said printer roll having a determined degree of rotation for defining one imprint pattern, a frame for said assembly unit mounted in the housing and presenting said unit intermediately along and operatively in the tape path, said bed roll presenting a substantial arc thereof for non-slip driving engagement by the tape and said printer roll being driven from the bed roll under draft upon the tape, variable length selector means correlated with said assembly to furnish on draft by the operator tape lengths of one or more imprint patterns as preselected by said means, and said selector means having associated therewith means operable at and by the start of tape draft for halting the draft at the selected number of imprint patterns.

2. Apparatus for serving adhesively conditioned lengths of heat-activatable tape, comprising an elongate housing having a tape delivery station at the fore end, means for rotatively mounting a supply roll of the tape in a fore portion of the housing, an elongate fore-and-aft conjoint guide and heater means for conducting tape from the roll rearwardly and then reversely forwardly over the roll position to the delivery station, said means enclosing an electrical resistance heater element throughout a major length thereof such that the tape is usefully adhesively heat-activated en route from the supply roll to the delivery station, tape printer means operatively interposed in the tape path between the supply roll and the tape guide and heater means for printing repeat impressions upon the tape, and length selector means for variably preselecting tape lengths corresponding to one or to more printing impressions as desired.

3. Dispensing apparatus particularly for heat-activatable tape having a body with a non-tacky face and an opposite face to be heat activated, comprising, a housing frame defining an elongate compartment adapted for rotatable support of a tape supply roll and being wholly closed save for a tape exit mouth at the fore end, an elongate flat-faced directive guide for tape from the roll, the guide having a substantially continuous wall for guidant cooperation with the non-tacky face of the tape, said guide wall having along it electrical heating means adapted to activate the heat-activatable face of the tape by heat directed primarily to the non-tacky face thereof, and a rotary printing repeat-impression assembly unit disposed in printing relation to the non-tacky tape face during travel thereof from the supply roll to the heating means, said tape exit mouth adapted to present the leading end of the tape for manual draft by the operator.

4. Dispensing apparatus according to claim 3 including draft-length control means adapted for variable setting to preselect the tape lengths to be delivered so as to present one or more printing impressions thereon as selected.

5. In a tape dispenser having a support for rotatably holding a roll of tape to be drawn on, an elongate guide element defining a path for tape draft, a rotary printer unit in the tape path from the supply to the guide element, said unit including an impression roll over a substantial arc of which the tape has non-slip driving engagement, a printer roll driven from the impression roll under draft upon the tape, and an ink roll rotatable in type-inking relation to the printer roll, a length selector rotatably driven in determined ratio to the printer roll for measuring tape length increments corresponding to rotational imprints of the printer roll, said selector variably settable for draft of different numbers of such increments per draft cycle, and means operable at and by the start of tape draft for coaction with the selector to halt the draft at the selected number of one-imprint length increments.

6. A tape dispenser according to claim 5 wherein the impression roll is rotatably carried by means adapted for bodily shifting it in self-parallelism toward and from the printer roll to facilitate replacement of the latter.

7. A tape dispenser according to claim 5 wherein the dispenser has a main frame mounting the roll support and guide element, and the rotary printer unit comprises a carrier demountably disposed on the main frame and having means rotatably supporting the several rolls, said means including an arm pivoted at one end on the carrier and pivotally mounting the impression roll at the other end for bodily shifting thereof to and from operative relation with the printer roll.

8. A tape dispenser according to claim 5 wherein means is provided for variably tilting the operative axis of the printer roll relative to the horizontal.

9. A tape dispenser according to claim 5 wherein means is provided for incrementally varying the axial position of the ink roll relative to the horizontal and to the printer roll axis.

10. A tape dispenser according to claim 5 wherein the impression roll is bodily shiftable to clear it from the printer roll.

11. A tape dispenser according to claim 5 wherein the inking roll is mounted to be bodily movable from and toward the printer roll.

12. A tape dispenser according to claim 5 wherein the impression roll is bodily shiftable to clear it from the printer roll, the inking roll is mounted to be bodily movable from and toward the printer roll, and connecting means is provided operatively between said rolls whereby clearant shifting of the impression roll is accompanied by movement of the inking roll from and to release the printer roll.

References Cited in the file of this patent

UNITED STATES PATENTS

| | | |
|---|---|---|
| 1,115,646 | Wronker | Nov. 31, 1914 |
| 2,204,972 | Rouan et al. | June 18, 1940 |
| 2,361,392 | Freedman | Oct. 31, 1944 |
| 2,407,300 | Smith | Sept. 10, 1946 |
| 2,631,534 | Uhl et al. | Mar. 17, 1953 |
| 2,671,271 | Aldrich | Mar. 9, 1954 |